United States Patent
Ludescher

(10) Patent No.: US 6,437,255 B1
(45) Date of Patent: Aug. 20, 2002

(54) CONVEYOR SCALE

(75) Inventor: Stefan Ludescher, Oftringen (CH)

(73) Assignee: K-Tron Technologies, Inc., Wilmington, DE (US)

( * ) Notice: Subject to any disclaimer, the term of this patent is extended or adjusted under 35 U.S.C. 154(b) by 0 days.

(21) Appl. No.: 09/341,655

(22) PCT Filed: Jan. 13, 1998

(86) PCT No.: PCT/CH98/00011

§ 371 (c)(1),
(2), (4) Date: Sep. 9, 1999

(87) PCT Pub. No.: WO98/31993

PCT Pub. Date: Jul. 23, 1998

(30) Foreign Application Priority Data

Jan. 17, 1997 (CH) .................................. 79/97

(51) Int. Cl.[7] ......................... G01G 11/14; G01G 13/02; G01G 23/01
(52) U.S. Cl. ........................... 177/16; 177/119; 73/1.13
(58) Field of Search ................. 177/119, 120, 177/121, 145, 16, 50; 73/1.13; 222/55, 56, 222

(56) References Cited

U.S. PATENT DOCUMENTS

| | | | | |
|---|---|---|---|---|
| 2,997,205 A | | 8/1961 | Schuerger et al. | 222/56 |
| 3,636,750 A | * | 1/1972 | Wojcik | 73/1.13 |
| 5,119,893 A | * | 6/1992 | Jost | 177/16 |
| 5,455,395 A | * | 10/1995 | Hafner | 177/145 |
| 5,547,034 A | * | 8/1996 | Wurz et al. | 177/145 |
| 5,567,919 A | | 10/1996 | Cote | 177/50 |

FOREIGN PATENT DOCUMENTS

| | | |
|---|---|---|
| EP | 413 601 | 8/1990 |
| FR | 2 129 807 | 11/1972 |
| GB | 358 786 | 10/1931 |
| WO | WO 91/14927 | 10/1991 |
| WO | WO 95/29390 | 11/1995 |

OTHER PUBLICATIONS

Kieth Weiskamp, "Turbo Pascal: Self–Teaching Guide", John Wiley & Sons, pp. 164–169, copyright1991.*
Stephen D. Burd, "Systems Architecture: Hardware and Software in Business Information Systems", CTI, pp. 145–184, copyright 1996.*
International Search Report for PCT/CH 98/00011.

* cited by examiner

Primary Examiner—Randy W. Gibson
(74) Attorney, Agent, or Firm—Ratner & Prestia

(57) ABSTRACT

The continuous weighing meter [according to the invention has] having a conveyor belt [(1)] driven by a motor [(3)] and running over a guide roller (4), which is loaded with bulk material via an input funnel [(6)] from a feed arrangement [(9)]. In addition to a first weighing arrangement [(11)], which determines the gross loading of the loaded conveyor belt [(1)], the continuous weighing meter has a second weighing arrangement [(15)], which determines the tare loading of the empty, but possibly dirty and inhomogeneous conveyor belt [(1)]. The weighing distances have the lengths $S_B$ [(11)] or $S_T$ [(15)] and are separated by a distance L between homologous points. The weighing results are converted to digital form in evaluation [equipments (22, 21)] units and taken to a computer [(25)] which calculates the net loading of the conveyor belt [(1)]. Additionally the computer [(25)] monitors the running of the belt for slip using increment transmitters [(17, 23)] and associated counters [(18, 24)] and generally controls the feed arrangement [(9)].

11 Claims, 2 Drawing Sheets

CONVEYOR SCALE

TECHNICAL FIELD

The present invention relates to a continuous weighing meter for bulk materials with zero adjustment control.

BACKGROUND OF THE INVENTION

Several processes and devices for the monitoring and recalibration of the zero point of conveyor scales are known. WO 91/14927 (D1) and WO 95/29390 (D2) may be cited as representing the large number of descriptions, which are part of the state of the technology. The aim of the aforementioned processes and devices and also of the present invention is to increase the accuracy of the determination of the flow of material by a continuous weighing meter. In WO 91/14927, the supply of bulk material to be measured is periodically interrupted to determine the zero point of the weighing returned by the empty belt, while in WO 95/29390, two weighing stations are provided downstream from the despatching station and, within certain tolerances, the two weighing results are applied to form an average.

Both in GB 358 786A and also in FR 2 129 807A, methods and devices are disclosed, with which the belt is weighed twice, indeed with a first weighing device on its upper side together with the bulk material placed on it, and with a second weighing device on its returning underside. In GB 358 786A, purely mechanical means are provided to form the difference between the two weights.

The disadvantage of this method and the corresponding devices lies first in that any material adhering to the belt distorts the second weighing on its underside. Furthermore, the weighing results are not correct if bulk material first adheres to the returning part of the belt, but then in the passage between the guide roller and the second weighing however is not present, or if bulk material falls from the upper side of the belt onto the returning part. Apart from this, in accordance with these publications, neither the position nor the speed of the belt is known. The speed of the belt can therefore be changed in a non-suitable manner, for example as a function of the difference between the target and actual values of the flow of the material, which makes both the maintenance of a desired flow of material and the use of spliced or non-homogeneous belts more difficult or entirely impossible. Furthermore, slip in the belt can neither be established nor compensated using the methods presented above.

In U.S. Pat. No. 2,997,205, a method and a device are presented, with which the belt is weighed twice on its upper side, in a first weighing device without the bulk material placed upon it, and then in a second weighing device together with the bulk material placed upon it. Here also, however, the exact time of running of a determined point on the belt between the two weighing devices is neither known nor of significance.

In none of the devices or methods mentioned above is the exact distance between the two weighing devices, measured along the direction of travel of the belt, of significance.

The periodic interruption of the supply obviously permits the calculation of the possibly varying zero point. This is however troublesome for many applications, since the despatch to another processing station of the material being weighed cannot be interrupted repeatedly without consequence. Added to this, the last calculated zero point remains stored for the period between two such interruptions. In the case of problematical bulk materials such as chocolate solids, flour and other partly sticky substances, the zero point can vary relatively quickly. The process described in WO 95/29390 does not contribute anything to the absolute accuracy of the weighing when residues of the materials mentioned—possibly even on the underside of the conveyor belt—build up slowly and remain there.

The aim which is to be addressed by the present invention, is the production of a continuous weighing meter, with which the zero point can be continuously and permanently determined and is always up to date and available for the processing of the gross weighing.

SUMMARY OF THE INVENTION

A continuous weighing meter for bulk material, constructed in accordance with the present invention, includes bulk material input means for supplying bulk material, a conveyor belt onto which the bulk material is deposited, and means for moving the conveyor belt. This continuous weighing meter also includes first weighing means positioned downstream from the bulk material input means and having a first force measuring cell over which the conveyor belt passes and first evaluation equipment for measuring the gross loading of the conveyor belt. This continuous weighing meter further includes second weighing means positioned upstream from the bulk material input means and having a second force measuring cell over which the conveyor belt passes and second evaluation equipment for measuring the tare loading of the empty conveyor belt. Also included in this continuous weighing meter are means for determining the running speed of the conveyor belt and a computer having a central processing unit and computing and control programs and responsive to the gross loading measurement of the conveyor belt, the tare loading measurement of the empty conveyor belt, and the determination of the running speed of the conveyor belt for determining the bulk material load on the conveyor belt during a period of time determined by the distance between the first force measuring cell and the second force measuring cell divided by the running speed of the conveyor belt.

The invention will be described in conjunction with the enclosed drawings.

DETAILED DESCRIPTION OF THE INVENTION

Figure 1:
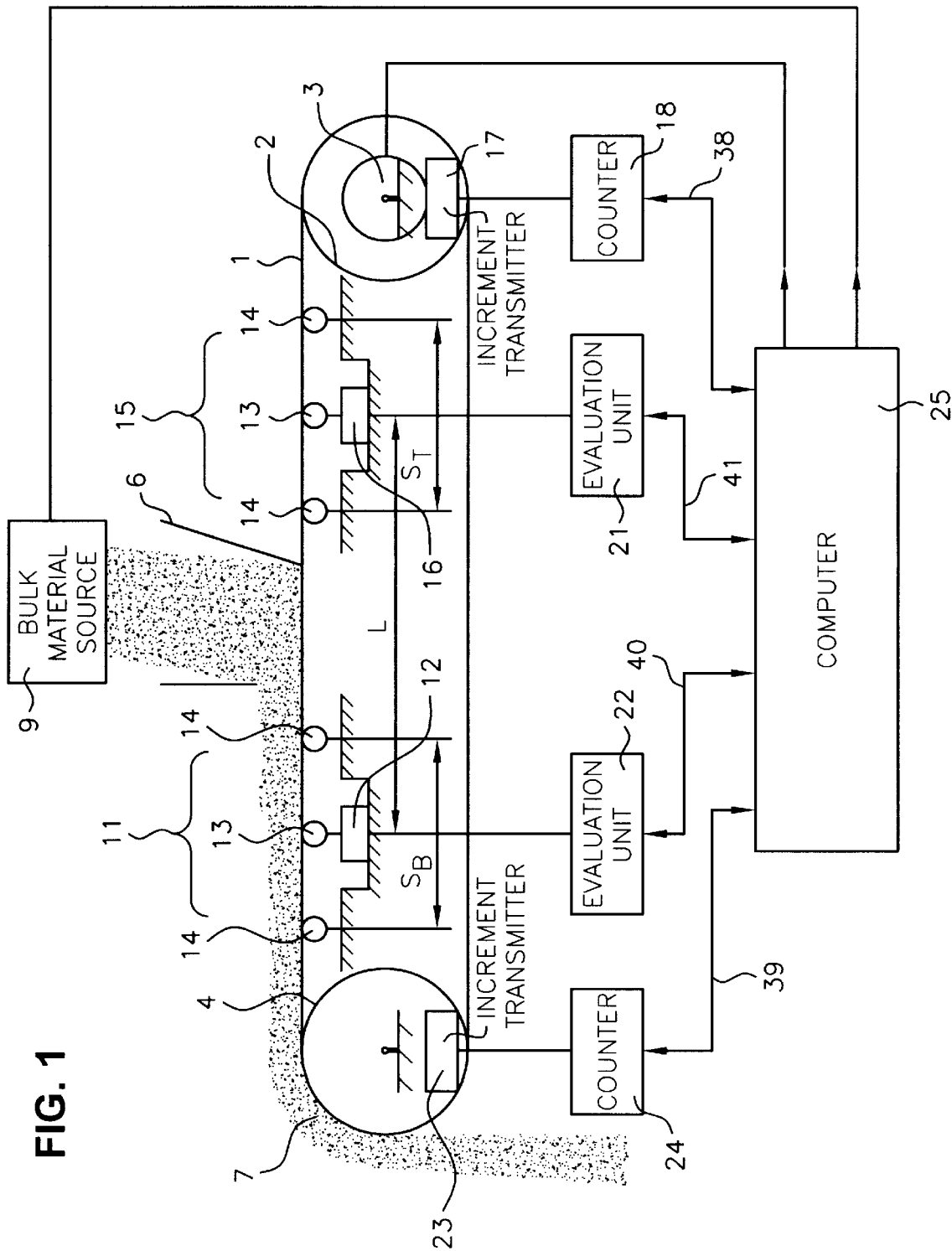
FIG. 1 is a schematic representation of the continuous weighing meter according to the invention.

In FIG. 1, the continuous weighing meter is shown in schematic form. A conveyor belt 1 is driven by an electric motor 3 via a drive roller 2 and runs over a guide roller 4. The guide roller 4 is also formed as a tensioning roller in a known manner. This construction is well known and so configured that even running of the conveyor belt 1 can be produced. Further, the positions of the drive roller 2 and the guide roller 4 can be interchanged.

An input funnel 6 guides the mass stream of a bulk material 7 to be metered onto the conveyor belt 1. The bulk material 7 is delivered to the input funnel in a known manner, using for instance a feed screw, vibrator, a conveyor belt or other known conveying method. These known and possible conveying methods are represented by the block bearing reference number 9. Direct delivery from a silo by the conveyor belt also is a possibility, in which case the conveyed quantity is controlled only by the speed of the conveyor belt 1. If a feed arrangement 9 is included, then this is also controlled as well as the belt speed.

In the direction of flow of the conveyor belt 1, after the input funnel 6 there is a weighing arrangement 11, comprising a force measuring cell 12, which measures the force on a rod 13 stretching across the entire width of the conveyor belt 1. The actual measurement distance, designated here by the letter S and at whose centre the rod 13 is positioned, is limited by two further rods 14. The relationship between the force measured by the measurement cell 12, the length of the measurement distance, the speed of the belt VB and the flow of material m is known and does not need to be discussed here. The flow of material m, determined in this manner, is in any case a gross value, since the weight of the conveyor belt 1 is continuously weighed in with it. Added to this, there are influences of the belt tightness, since, for instance, the rod 12 lies somewhat higher than the two rods 14. The gross value m has thus to be cleaned up by a tare value, which is given by the measurement of the empty conveyor belt 1.

Now instead of periodically interrupting the flow of the bulk material 7, to obtain the tare value, which remains stored until the next determination, according to the arrangement shown in FIG. 1, a second weighing arrangement 15 is provided, preferably fully identical to the weighing arrangement 11. This second weighing arrangement 15 is positioned before the input funnel 6 in the direction of the movement of the conveyor belt 1 and comprises similarly two rods 14 defining the measurement distance S and a weighing force accepting rod 13, which for its part impacts on a force measurement cell 16. The signals generated by the force measurement cells 12, 16 are each converted into digital weight signals by evaluation units 21, 22 which are conducted to a computer 25.

Figure 2:
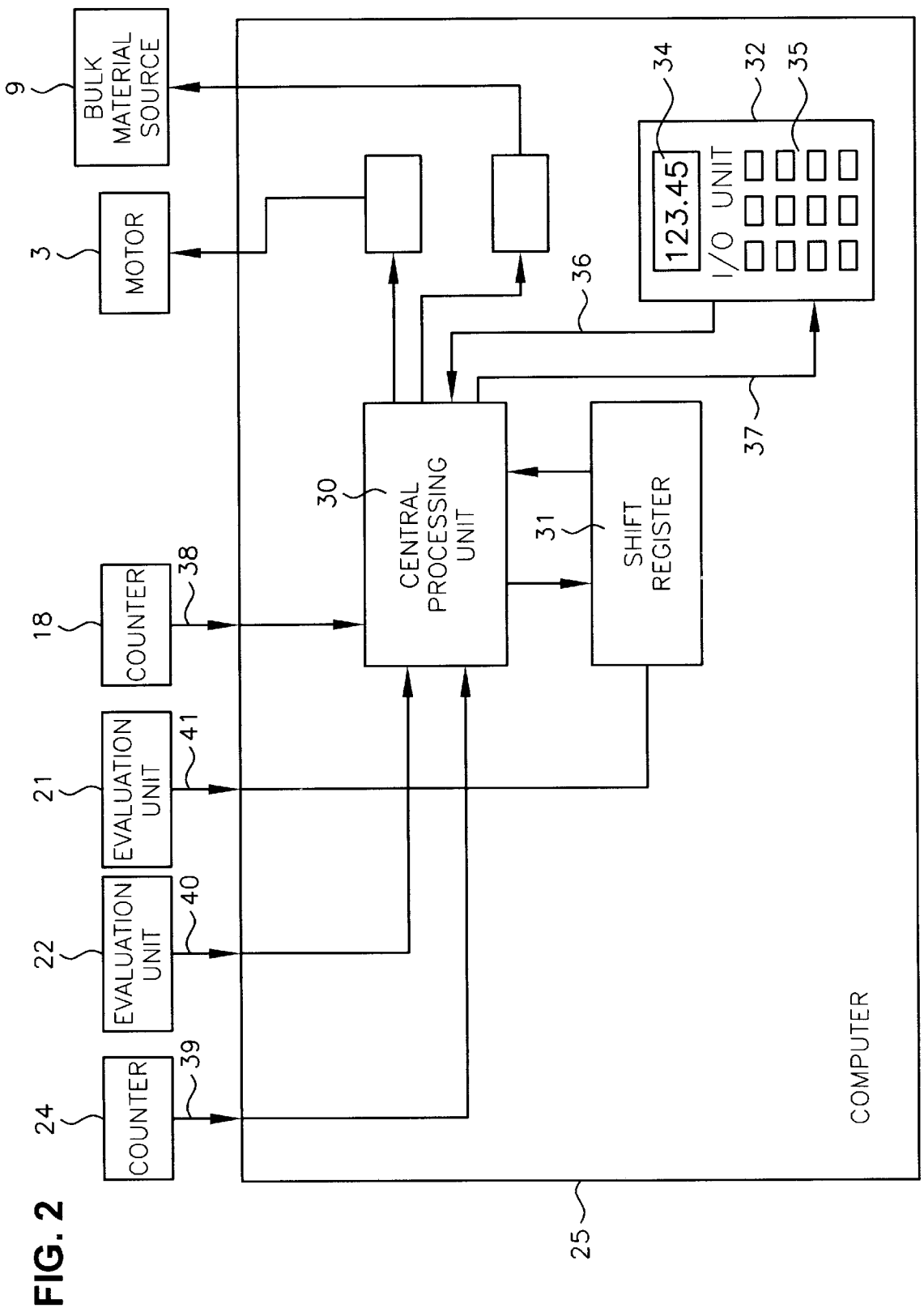
FIG. 2 is a block schematic of the electrical equipment.

The interaction between the two weighing arrangements 11 and 15 is explained first in summary, bringing into consideration other elements shown in FIG. 1, and then in greater detail using FIG. 2.

On the motor 3 or on a drive connected to the motor not separately shown, an increment transmitter 17 is connected, with the aid of which a digital signal is generated in a counter 18, corresponding to the speed of rotation of the drive roller 2. Additionally, an increment transmitter 23, similar to the increment transmitter 17, can measure the rotational speed of the guide roller 4. The signals of the increment transmitter 23 are then converted into a digital signal, corresponding to the speed of rotation of the guide roller 4, in a second counter 24. In so far as the conveyor belt 1 exhibits no slip on the drive roller 2, the signals generated by the counters 17 and 23 and passed to the computer 25 are of the same amplitude; a difference between the two signals means that there is slip in the conveyor belt 1 in which case the computer 25 generates a corresponding signal, which for example can be used for automatic stoppage of the FIG. 1 equipment.

From the foregoing, the time required for a particular point on the conveyor belt 1 to pass over the measurement distance S and the time expiring for the same point to pass over the distance L between the two rods 13 lying in the middle of the weighing arrangements 11, 15 can be determined. For the general case, where the weighing arrangements 11, 15 are not identically constructed, the measurement distance of the weighing arrangement 11 is designated $S_B$ and that of the weighing arrangement 15 is designated $S_T$.

A weighing process for each of the two force measurement cells 12, 16 requires a certain, typically short, time interval, which may be to develop an average, or it may be, as in the case of string force measurement cells, for systematic reasons. In the stated time interval, the conveyor belt 1 moves forward past the weighing arrangement 11 by a certain distance $S_B$/kB under the assumption that in the time during which the conveyor belt 1 covers the distance $S_B$, kB weighings are undertaken. The weighing arrangement 15 has the measurement distance $S_T$ and similarly a certain, possibly differing, time interval for a weighing, so that in the same time, when the weighing arrangement 11 performs kB weighing operations, kT weighings are available from the weighing arrangement 15. It is expedient that kB=kT. As discussed further below, however, it is possible that kT=kB/h; i.e. the weighing arrangement 15 works with a lower time resolution than weighing arrangement 11. If further $S_B$? $S_T$, then, for the calculation of the tare loading by the computer, the measurement distance $S_T$ of the weighing arrangement 15 and the number $kT.S_T/S_B$ completed by the travel of the conveyor belt 1 over this measurement distance are brought in. Analogous to this consideration, during the time in which the conveyor belt 1 passes over the distance L, j weighing operations occur in the weighing arrangement 11.

FIG. 2 shows in block schematic form, how the different digital signals are processed. The computer is shown in FIG. 1 as a box identified by the reference 25. It comprises a central processing unit 30, which undertakes all the arithmetic and logic operations and also contains the control program in file. An input/output unit 32 is connected to the central processing unit 30 by data feeder lines 36, 37, via which the control quantities, such as belt speed, bulk flow, on and off commands and, if provided in the program, limit values (for instance for target deviation and maximum tare value) can be input. Inputs are effected via the input/output unit 32 using a schematically represented keyboard 35; output values are shown by numerical magnitudes and operating conditions on a visual display unit 34. The input values covering motor revolutions (18), belt running speed (24) and gross weighing (22) are fed in directly to the central processing unit 30 over bidirectional data lines 38, 39, 40; bidirectional because the central processing unit 30 outputs at least the central timing for the elements referenced as 18 to 24. The evaluating unit for tare weighing, that is for the weighing arrangement 15, is connected via a further bidirectional line 41 to a shift register 31. This includes, for example, j counting stages, whose content is shifted by one stage forward at each pulse with the reasonable assumption, that the weighing arrangements 11, 15 carry out their weighing operations at the same clock speed. The result output from the last stage with the number j is processed with the result of the gross weighing of weighing arrangement 11 in the central processing unit 30 to give a net result; the entry read into the counting stage with the number 1 is the current weighing of weighing arrangement 15. It is within the scope of the invention, that the number of counting stages j might be reduced by a factor h with a simultaneous reduction of the shift timing by the same factor h. This has the consequence that a certain tare result of the weighing arrangement 15 is used for h gross weighings. This can be indicated when the positional and time variations of the tare result is small.

Instead of a shift register 31, the use of an addressable RAM with j numbered store locations is similarly within the scope of the invention, whereby the reduction to j/h store locations, as previously mentioned, is similarly included within the scope of the invention. In this arrangement, at each weighing, gross as well as tare, the corresponding store location is addressed and at the same time the address selector is advanced by one number.

The running speed of the belt (Motor 3) and the feed arrangement 8 controlling the flow of the bulk material 7 can be controlled by the process program in the central processing unit; processes and devices for this purpose are known; likewise for the processing of the data from the devices designated 17 to 24.

The advantage of the application described here of the second weighing cell 15 evaluating the running tare value is that a tare weighing, which is currently determined, is available for every gross weighing and also periodical variations of the tare, such as inhomogeneities of the conveyor belt 1, and also irregularities such as dirtying of the belt (including the build-up of incrustations) are equally captured and considered. On the one hand, this obviates the periodic empty running of the conveyor belt 1, and, on the other hand, one is not working with an average tare value, but with a multiplicity of individual and currently updated values.

The measures under the invention also increase the availability of the feed mechanism, which forms the decisive part of the continuous weighing meter.

A further advantage of the continuous weighing meter according to the invention is that spliced conveyor belts can be used instead of circular woven or otherwise homogeneous products. Spliced conveyor belts exhibit an inhomogeneity at the spliced section, which cannot be taken into account using stored tare values.

Using the arrangement according to the invention, mass inhomogeneities, irrespective of their cause, are effectively subtracted and thereby the resolution and accuracy of the continuous weighing meter is increased with simultaneous reduction of the cost of the conveyor belt as a welded part.

While in the foregoing there have been described preferred embodiments of the present invention, it should be understood by those skilled in the art that various modifications and changes can be made without departing from the true spirit and scope of the present invention.

What is claimed is:

1. A continuous weighing meter for bulk material comprising:

bulk material input means for supplying bulk material;

a conveyor belt having an upper surface onto which the bulk material is deposited and an underside;

means for moving said conveyor belt;

first weighing means:

(a) positioned downstream from said bulk material input means and below said underside of said conveyor belt, and (b) having a first force measuring cell over which said underside of said conveyor belt passes and first evaluation equipment for measuring the gross loading of said conveyor belt;

second weighing means:

(a) positioned upstream from said bulk material input means and below said underside of said conveyor belt, and (b) having a second force measuring cell over which said underside of said conveyor belt passes and second evaluation equipment for measuring the tare loading of the empty conveyor belt;

means for determining the running speed of said conveyor belt; and a computer:

(a) having a central processing unit and computing and control programs, and (b) responsive to:

(1) the gross loading measurement of said conveyor belt, (2) the tare loading measurement of the empty conveyor belt, and (3) the determination of the running speed of said conveyor belt for determining the bulk material load on said conveyor belt during a period of time determined by the distance between said first force measuring cell and said second force measuring cell divided by the running speed of said conveyor belt.

2. A continuous weighing meter according to claim 1 wherein:

(a) said first weighing means further include:

(1) first and second rods:

(i) extending across said conveyor belt, (ii) disposed perpendicular to the direction of movement of said conveyor belt, and (iii) separated by a first distance over which said first weighing means measure the gross loading of said conveyor belt, and (2) a third rod:

(i) extending across said conveyor belt, (ii) disposed between said first and said second rods perpendicular to the direction of movement of said conveyor belt, and (iii) disposed between said underside of said conveyor belt and said first force measuring cell, and (b) said second weighing means further include:

(1) fourth and fifth rods:

(i) extending across said conveyor belt, (ii) disposed perpendicular to the direction of movement of said conveyor belt, and (iii) separated by a second distance over which said second weighing means measure the tare loading of the empty conveyor belt, and (2) a sixth rod:

(i) extending across said conveyor belt, (ii) disposed between said fourth and said fifth rods perpendicular to the direction of movement of said conveyor belt, and (iii) disposed between said underside of said conveyor belt and 3aid second force measuring cell.

3. A continuous weighing meter according to claim 2, wherein the first distance and the second distance are the same.

4. A continuous weighing meter according to claim 2, wherein:

(a) said computer includes a shift register with j/h counting stages, where j and h are whole numbers and j corresponds to the number of weighings made by said first weighing means in the time that said conveyor belt moves from said sixth rod to said third rod, (b) each weighing by said second weighing means is read into said shift register and the j/h weighing result of the second weighing means is shifted by a counting step, and (c) the weighing read from the last counting stage of said shift register from said second weighing means is the tare value for the gross value measured from said first weighing means, whereby a determination of the bulk material load on said conveyor belt is made by said central processing unit.

5. A continuous weighing meter according to claim 4, wherein:

(a) said first weighing means and said second weighing means are identical, (b) h=1, and (c) said first weighing means and said second weighing means operate with the same timing.

6. A continuous weighing meter according to claim 4, wherein:

(a) said computer includes an addressable RAM with j/h storage locations, where j and h are whole numbers and j corresponds to the number of weighings made by said first weighing means in the time that said conveyor belt moves from said sixth rod to said third rod, (b) each weighing result from the second weighing arrangement is read into said RAM, whereby the address is increased by the value of 1 in each case, and (c) the weighing result read out from the store location with the address j/h from the second weighing means is available as the tare value for the gross value determined from the first weighing arrangement whereby the determination of the net value is undertaken in the central processing unit, whereby a determination of the bulk material load on said conveyor belt is made by said central processing unit.

7. A continuous weighing meter according to claim 6, wherein:

(a) said first weighing means and said second weighing means are identical, (b) h=1, and (c) said first weighing means and said second weighing means operate with the same timing.

8. A continuous weighing meter according to claim 1, wherein said computer includes:

(a) an input/output unit connected to said central processing unit, (b) a keyboard for inputting operationally required parameters and control values, and (c) a visual display unit for presentation of operational data and conditions.

9. A continuous weighing meter for bulk materials comprising:

bulk material input means for supplying bulk material;

a conveyor belt having an upper surface onto which the bulk material is deposited and an underside;

means for moving said conveyor belt;

first weighing means:

(a) positioned downstream from said bulk material input means and below said underside of said conveyor belt, and (b) having a first force measuring cell over which said underside of said conveyor belt passes and first evaluation equipment for measuring the gross loading of said conveyor belt as a selected portion of said conveyor belt passes said first weighing means;

second weighing means:

(a) positioned upstream from said bulk material input means and below said underside of said conveyor belt, and (b) having a second force measuring cell over which said underside of said conveyor belt passes and second evaluation equipment for measuring the tare loading of said conveyor belt as said selected portion of said conveyor belt passes said second weighing means; and computing means responsive to:

(a) the gross loading measurement of said conveyor belt taken as said selected portion of said conveyor belt passes said first weighing means, and (b) the tare loading measurement of said conveyor belt taken as said selected portion of said conveyor belt passes said second weighing means for determining the bulk material load on said conveyor belt at said selected portion of said conveyor belt.

10. A continuous weighing meter according to claim 9 wherein said computing means include:

(a) delay means for delaying the tare loading measurement of said conveyor belt taken as said selected portion of said conveyor belt passes said second weighing means until said selected portion of said conveyor belt reaches said first weighing means, and (b) subtracting means for subtracting the delayed tare loading measurement from the gross loading measurement of said conveyor belt taken as said selected portion of said conveyor belt passes said first weighing means for determining the bulk material load on said conveyor belt at said selected portion of said conveyor belt.

11. A continuous weighing meter according to claim 10:

(a) further including means for determining the running speed of said conveyor belt, and (b) wherein said delay means delay the tare loading measurement by a period of time determined by the distance between said first force measuring cell and said second force measuring cell divided by thee running speed of said conveyor belt.

* * * * *

UNITED STATES PATENT AND TRADEMARK OFFICE
CERTIFICATE OF CORRECTION

PATENT NO. : 6,437,255 B1
DATED : August 20, 2002
INVENTOR(S) : Stefan Ludescher It is certified that error appears in the above-identified patent and that said Letters Patent is hereby corrected as shown below:

<u>Title page,</u>
Item [57], ABSTRACT,
Lines 1-2, delete "[according to the invention has]".
Lines 2, 7, 10 and 15, delete "[(1)]".
Line 2, delete "[(3)]".
Line 3, delete "[(4)]".
Line 4, delete "[(6)]".
Lines 4 and 18, delete "[(9)]".
Lines 4 and 11, delete "[(11)]".
Lines 8 and 11, delete "[(15)]".
Line 13, delete "[equipments (22, 21)]".
Lines 14 and 16, delete "[(25)]".
Line 17, delete "[(17, 23)]".
Line 17-18, delete "[(18, 24)]".

<u>Column 3,</u>
Line 18, "12" should read -- 13 --.

<u>Column 5,</u>
Line 2, "8" should read -- 9 --.

<u>Column 6,</u>
Line 44, "3aid" should read -- said --.

Signed and Sealed this

Eighteenth Day of February, 2003

JAMES E. ROGAN
*Director of the United States Patent and Trademark Office*